United States Patent
Bilardello et al.

(10) Patent No.: US 6,759,027 B1
(45) Date of Patent: Jul. 6, 2004

(54) METHOD AND INSTALLATION FOR CARRYING OUT A THREE PHASE CHEMICAL REACTION UNDER PRESSURE

(75) Inventors: Pietro Bilardello, Vanves (FR); Nicolas Durupt, Limoges (FR); Renaud Pontier, Luzinay (FR)

(73) Assignee: Compagnie Generale des Matieres Nucleaires, Velizy-Villcoublay (FR)

( * ) Notice: Subject to any disclaimer, the term of this patent is extended or adjusted under 35 U.S.C. 154(b) by 624 days.

(21) Appl. No.: 09/591,118

(22) Filed: Jun. 9, 2000

(30) Foreign Application Priority Data

Jun. 17, 1999 (FR) .............................................. 99 07678

(51) Int. Cl.⁷ .............................................. C01G 43/00
(52) U.S. Cl. ............... 423/659; 423/260; 423/DIG. 13; 423/DIG. 9
(58) Field of Search ........................... 423/659, DIG. 9, 423/DIG. 13, 260; 261/77, 123; 422/231, 215

(56) References Cited

U.S. PATENT DOCUMENTS

| | | | |
|---|---|---|---|
| 3,754,993 A | * | 8/1973 | Oguchi et al. ....... 423/DIG. 16 |
| 3,759,669 A | | 9/1973 | Aaron et al. |
| 4,234,560 A | * | 11/1980 | Kuerten et al. ............. 423/659 |
| 5,181,993 A | * | 1/1993 | Furuya ........................ 204/86 |
| 5,274,163 A | | 12/1993 | Rechner et al. |
| 5,407,644 A | * | 4/1995 | Rytter et al. ................. 422/147 |

FOREIGN PATENT DOCUMENTS

| | | | |
|---|---|---|---|
| EP | 295999 | * | 12/1988 |
| GB | 238 303 | | 8/1925 |
| JP | 61 108370 | | 5/1986 |

* cited by examiner

*Primary Examiner*—Steven Bos

(57) ABSTRACT

A gas siphon type reactor (10) is used to carry out a three phase chemical reaction under pressure, such as the reduction of uranyl nitrate to uranous nitrate by hydrogen, in the presence of a catalyst made up of platinum on a silica carrier. The control of the pressure in the reactor (10) is provided by regulating the liquid and gas flow rates from a high pressure separator (52), into which the liquid and the gas leaving the reactor (10) are routed. The liquid in the reactor (10) is tapped from a lateral branch pipe (32) fitted with a filter (36) and emerging in the upper area (30), behind a profiled wall (34).

7 Claims, 2 Drawing Sheets

METHOD AND INSTALLATION FOR CARRYING OUT A THREE PHASE CHEMICAL REACTION UNDER PRESSURE

TECHNOLOGICAL FIELD

The invention relates to a method and an installation designed to carry out a three phase chemical reaction under pressure, such as a reaction in which a liquid product is reduced by a gaseous reducing agent, in the presence of a solid catalyst.

The invention can be applied to all cases in which a chemical reaction is carried out in the presence of a gas phase and two non-gaseous phases, at least one of which is a liquid. Depending on the case, the other non-gaseous phase is either a solid or a liquid.

A favored application relates to the reaction of reducing uranyl nitrate to uranous nitrate, in which the reducing agent is hydrogen under pressure and the catalyst is made up of platinum on a silica carrier.

STATE OF THE TECHNOLOGY

Three phase reactions, such as reduction reactions which are carried out in the presence of a catalyst are carried out in chemical reactors. In most cases, reactors with a stationary bed, reactors with mechanical agitation or fluidized bed reactors, are used.

In stationary bed reactors, the liquid product to be treated and the gaseous reducing agent circulate in co-current or counter-current upwards inside the reactor, passing through the solid catalyst, this being retained in a fixed fashion at a defined level in the reactor.

In reactors with mechanical agitation, as for example fluidized bed reactors, the solid catalyst is in suspension within the liquid phase, inside the reactor.

In the case of reactors with mechanical agitation, the suspension of the solid catalyst is provided by mechanical agitation of the different phases present inside the reactor.

In the case of fluidized bed reactors, it is the displacement of the fluid (liquid or gaseous) which, above a certain speed threshold, brings about the suspension of the solid catalyst.

Certain three phase chemical reactions are characterized by the particular operating conditions such as the presence of a gas phase under pressure and the strongly exothermic nature of the reaction. The reduction of uranyl nitrate to uranous nitrate belongs to this category. Hence, the pressure of hydrogen is preferably between about 30 bars and about 60 bars. Furthermore, the reaction produces 33 kcal/mole of converted uranium, while it is desirable to be preferably between about 10° C. and about 20° C. in order to avoid parasitic reactions.

Currently, this type of reaction using a gaseous reducing agent under pressure is carried out industrially in stationary bed reactors. However, this technology has a certain number of disadvantages.

Hence, stationary bed reactors have a large pressure drop, because the liquid has to pass through the catalyst bed and the sintered element. This phenomenon which requires the catalyst to be subjected to high pressure, encourages the active part of the catalyst to be detached from its carrier by attrition. From this stem the risks of corrosion of the welds of the reactor body and of the sintered element, which also risks being blocked by the fine detached particles. So as to prevent these problems, it is necessary to change the sintered element retaining the catalyst regularly (for example every 300 hours) as well as the reactor body (for example, once a year).

In addition, the operation of such a reactor means having a temperature gradient between the hot upper part and the cold lower part. The control of the temperature in the center, which is necessary to prevent the parasitic reactions when the reduction reaction is strongly exothermic, means that a relatively large number of temperature sensors (for example, five) has to be used. In effect, the presence of hot spots (common in stationary bed reactors), associated with differences in reactivity, is difficult to detect.

Apart from this, in stationary bed reactors, the fall-off in catalyst activity requires regular replacement of the catalyst (for example, once a year).

If the products being processed are dangerous or radioactive, the replacement of movable components in contact with these products requires complex intervention operations in order to guarantee safety.

Among other reactors currently used to carry out three phase reactions, mechanical agitation reactors provide very good contact between the phases. However, they encourage attrition of the solid catalyst. Furthermore, they have the disadvantages of high energy consumption and problems associated with providing seals due to the presence of moving components that pass through the walls.

In addition, fluidized bed reactors remain generally restricted with regard to material and heat transfer, which can pose delicate problems in the case of a reaction that is strongly exothermic. Furthermore, the input flow rate of the liquid phase is restricted to relatively low values.

In addition, gas siphon type reactors are known which comprise a central region called the riser and an annular region called the downcomer, separated by a cylindrical partition. In these reactors, a liquid recirculation loop is created by injecting a gas into the lower part of this central region, in a way that provides an ascending circulation in this central region and a descending circulation in the annular region.

Currently, reactors of this type are only used industrially in very well defined fields which are the treatment of waste water, aerobic fermentation (agro-food field) and the growth of micro-organisms (pharmaceutical field). This equipment operates at atmospheric pressure or under moderate pressure (less than 5 bars).

DESCRIPTION OF THE INVENTION

The precise subject of the invention is a method and an installation designed to carry out a three phase reaction under pressure while avoiding all the disadvantages of the techniques which have been used up to now for this purpose, in particular requiring reduced maintenance, permitting simplified control of the reaction and allowing charging, discharging and regeneration of the catalyst to be automated.

To this end, a method of carrying out a three phase chemical reaction under pressure is proposed that involves a gas phase and two non-gaseous phases, at least one of which is liquid, characterized in that it comprises the following steps:

circulating, in a closed loop and co-currently, the two non-gaseous phases, in a reactor, by the injection of the gas phase into the bottom of a central region of the reactor, in a way that creates an ascending circulation in said central region and a descending circulation in the annular region of the reactor, separated from the central region by a cylindrical partition separation and recovery, in an upper region of the reactor, of the excess gas phase and a liquid fraction corresponding to the input flow rate of the liquid phase;

separate routing of the excess gas phase and the liquid fraction into a separator, which may include a high pressure separator, outside the reactor; and adjustment of the pressure in the reactor and the level in the separator, by adjustment of gas flow rate and the liquid flow rate leaving the separator.

The use of a gas siphon type of reactor connected to a separator, such as a high pressure separator, enables one to regulate the pressure and the level in the reactor in a simple way, while benefitting from the advantages provided by this type of reactor.

Preferably, the liquid fraction is recovered in the upper region of the reactor, through a lateral branch pipe positioned behind a profiled wall that inflects the circulation to the annular region of the reactor and the liquid fraction is filtered from any possible traces of solid material, such as catalyst, carried along to the branch pipe inlet.

According to the reaction used, the gaseous and non-gaseous phases are cooled and heated inside the reactor.

In a preferred application of the invention, a reduction reaction is carried out under pressure, of a liquid product by a gaseous reducing agent, in the presence of a solid catalyst.

Preferably, in this preferred application of the invention, the solid catalyst is periodically regenerated inside the reactor, by carrying out the following steps:

discharge of the liquid phase;
filling the reactor with water;
sparging with an inert gas, for a specified time;
emptying the water.

The invention particularly relates to the reduction of uranyl nitrate with hydrogen in the presence of platinum on a silica carrier.

Another subject of the invention is an installation for carrying out a three phase chemical reaction under pressure, that involves a gas phase and two non-gaseous phases, at least one of which is liquid, characterized in that it comprises:

a reactor including a central region and an annular region, separated by a cylindrical partition, means for injecting the gas phase into the bottom of the central region, to create closed loop and co-current circulation of the two non-gaseous phase, ascending in the central region and descending in the annular region; said reactor further including an upper region for the separation and recovery of the excess gas phase and a liquid fraction that corresponds to the input flow rate of the liquid phase;

a separator, which may include a high pressure separator, outside the reactor and connected to the upper region of the reactor, so as to separately route the excess gas phase and the liquid fraction into the separator, and means of adjusting the gas flow rate and the liquid flow rate leaving the separator, so as to regulate the pressure in the reactor and the level in the separator.

BRIEF DESCRIPTION OF THE DRAWINGS

A preferred embodiment of the invention will now be described as a non-limitative example, making reference to the appended drawings, in which.

DETAILED DESCRIPTION OF A PREFERRED EMBODIMENT OF THE INVENTION

Figure 1:
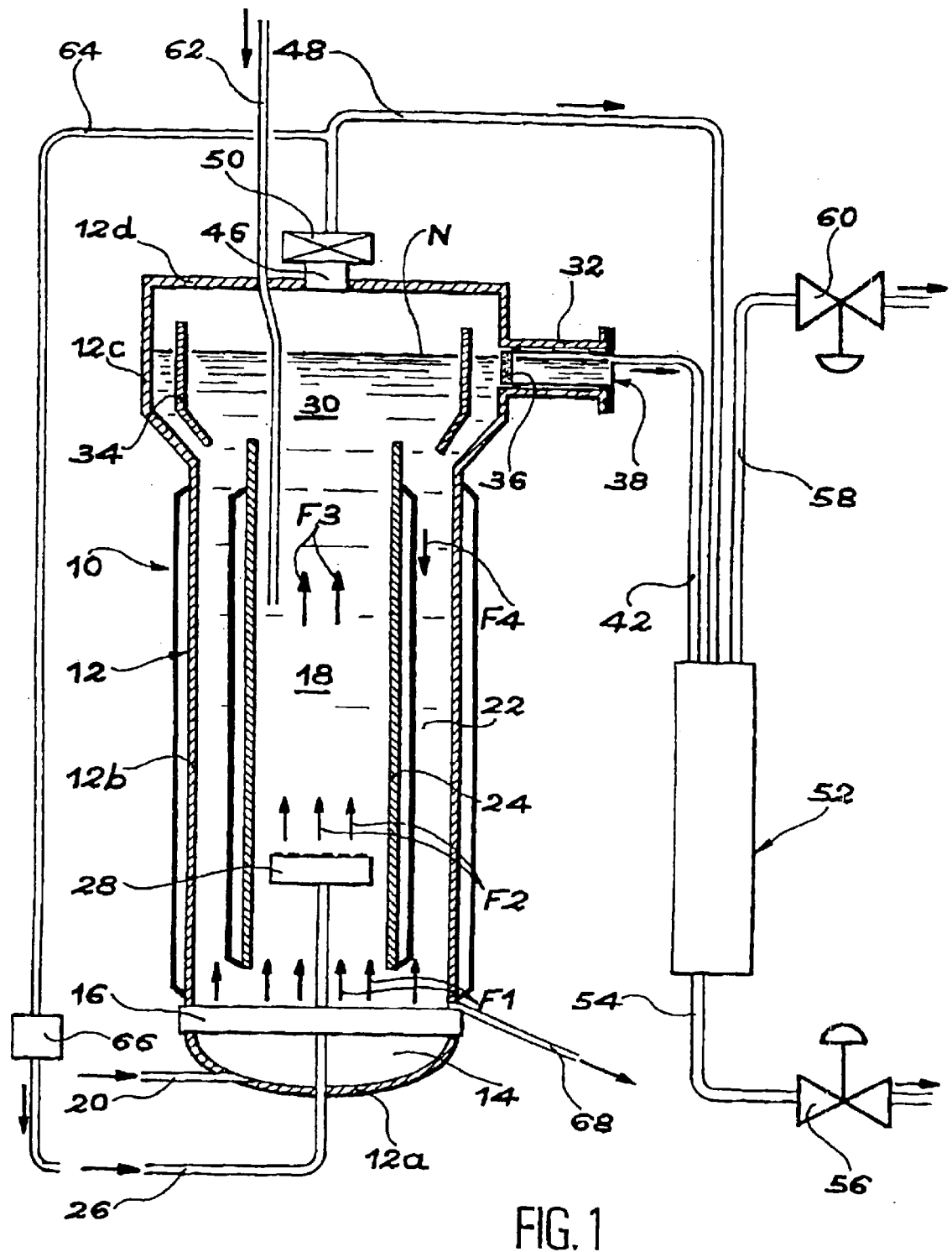
FIG. 1 is a partial section view which diagrammatically represents an installation conforming to the invention.

FIG. 1 represents in a very diagrammatic fashion, the main components of an installation designed to carry out a reduction reaction under pressure in conformity with the invention.

This installation mainly comprises a reactor 10, of the gas siphon type. The reactor 10 includes notably an external jacket 12 substantially having the shape of a cylinder with a vertical axis. The jacket 12 has a domed bottom 12a, with a cylindrical part 12b of uniform diameter above it, which opens out 12c in the upper part of the reactor, before being closed off by a substantially horizontal part 12d.

The lower region 14 of the reactor 10, defined by the inside of the domed bottom 12a, constitutes a region for the introduction of liquids. This region is bounded at the top by a distribution plate 16, such as a porous partition, a perforated plate or any equivalent device, capable of providing uniform distribution of the liquid upwards, into a central region 18 of the reactor. The injection of the liquid into the lower region 14 is provided by at least one pipe 20 passing through the bottom 12a.

The part of the reactor 10 situated above the distribution plate 16 is externally bounded by the cylindrical part 12b of the jacket 12 of uniform diameter. It includes the central region 18 and an annular region 22 surrounding this central region and separated from it by a cylindrical partition 24, of uniform diameter, centered on the vertical axis of the reactor. The lower edge of the cylindrical partition 24 is sufficiently spaced from the top face of the distribution plate 16 to allow recirculation of the fluids. The distribution plate 16 can be constituted by sintered elements that permit the passage of liquid and prevent leakage of catalyst particles down to the lower region 14.

The gases are introduced into the reactor 10 through a pipe 26 which emerges upwards into the lower part of the central region 18, through a distribution device 28 such as a perforated or sintered crown, shaped like a knob. The gases coming out of device 28 and passing upwards into the central region 18 are illustrated by arrows F2 in FIG. 1.

The top edge of the cylindrical partition 24 is situated substantially at the level of the bottom of the flared part 12c of the external jacket 12 of the reactor. The upper region 30 of the reactor situated inside this flared part 12c forms a region of disengagement. In this region, the separation of the liquids and gases occurs as well as the separate recovery of each of them.

To put it more precisely, a liquid fraction is recovered through a lateral branch pipe 32 which emerges horizontally into the upper region 30, below the level N of the liquid in this zone.

Figure 2:
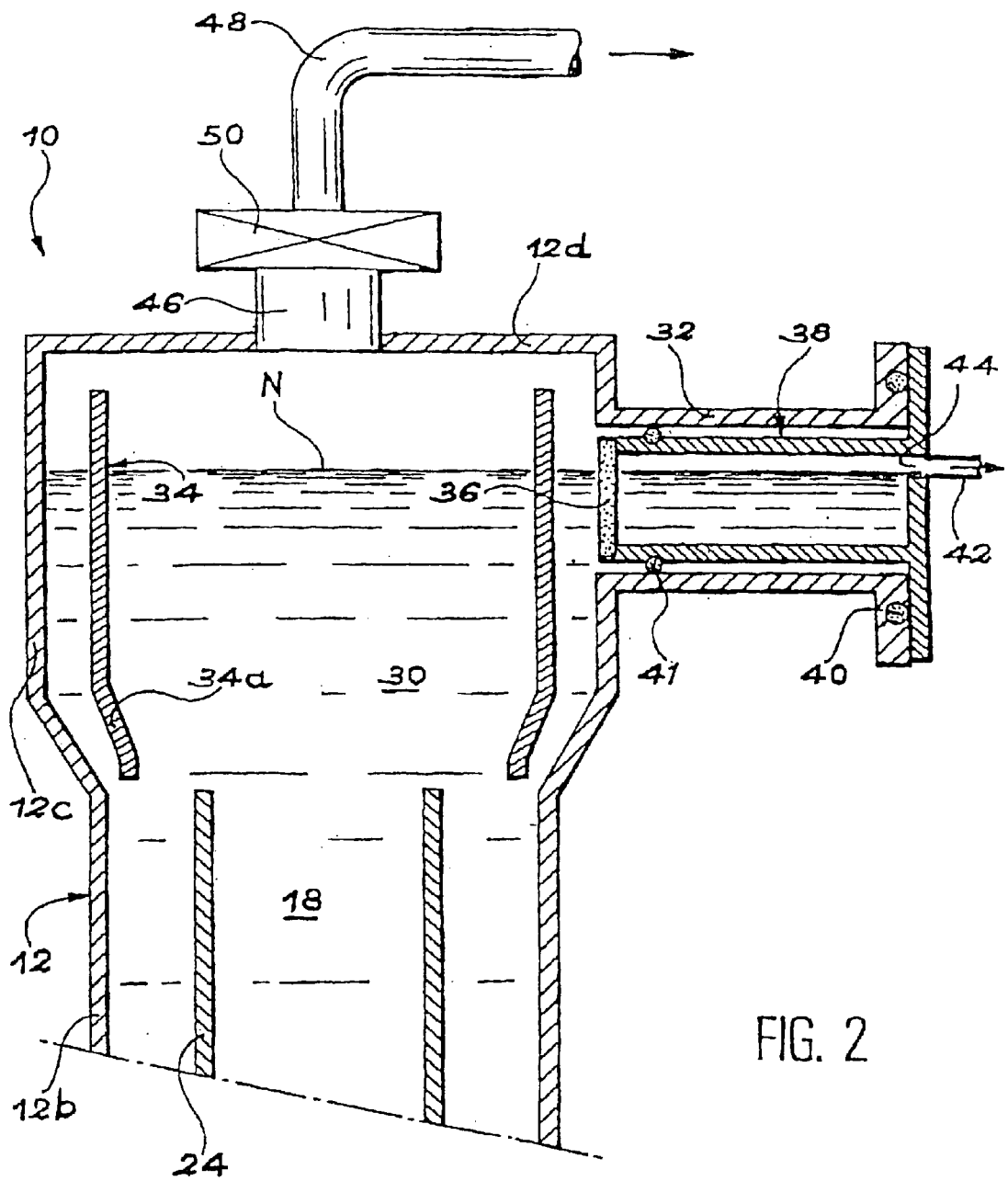
FIG. 2 is a section view on a larger scale, showing the upper region of the reactor in FIG. 1.

As is illustrated in greater detail in FIG. 2, the lateral branch pipe 32 emerges into the upper region 30 behind a profiled wall 34. This wall 34 is centered on the vertical axis of the reactor and overlaps the upper flared part 12c of the external jacket 12 on the inside, at a distance from it and over the major part of its height. Hence, the top edge of the profiled wall 34 is spaced apart from the substantially horizontal part 12d of the external jacket 12. In addition, the lower part 34a of the profiled wall 34 forms a funnel or a hopper which inflects downward the circulation of the liquid-solid mixture that arrives in the upper region 30, so as to facilitate a descending flow of this mixture within the annular region 22.

A filter 36, intended to retain the particles of solid catalyst, that may be carried over, is placed at the inlet to the lateral branch pipe 32, at the level of the flared upper part 12c of the jacket 12 of the reactor. As is better illustrated in FIG. 2, this filter 36 is mounted on a detachable tubular support 38, normally received in a sealed fashion in the lateral branch pipe 32. The seal is provided, for example, by means of O-ring seals 40 and 41. The liquids collected through the lateral branch pipe 32 leave the reactor through an overflow pipe 42, fitted onto a hole 44 formed in the tubular support 38. The bottom of this hole 44 determines the level N of the liquid in the upper region 30 of the reactor 10.

In addition, the evacuation of the excess gases, separated from the liquids in the upper region 30, takes place through a branch pipe 46 directed upwards which passes through the substantially horizontal part 12d of the external jacket 12 of the reactor 10. The gases which escape from the reactor through the branch pipe 46 are discharged through a pipe 48, the inlet to which can be fitted with a bubble removing device 50.

Referring once again to FIG. 1, it can be seen that the installation comprises additionally, outside the reactor 10, separator 52 into which the pipes 42 and 48 emerge respectively carrying the liquid and gaseous phases coming from the reactor. More precisely, the relative fitting of the lateral branch pipe 32 and the separator 52 is such that the liquid phases leaving the reactor 10 flow into the separator under gravity.

The liquid phases from the separator 52 flow under gravity into the bottom of it, through a pipe 54 controlled by valve 56.

In addition, the gaseous phases from the separator 52 flow from the top part of it, through a pipe 58 controlled by a valve 60.

This arrangement enables one effectively to control the pressure and the level in the reactor 10 and in the separator 52, by acting on both valves 56 and 60.

The way this installation is used will now be described, within the context of the reduction under pressure of uranyl nitrate to uranous nitrate by hydrogen, in the presence of a catalyst made up of platinum on a silica carrier.

The catalyst is introduced into the reactor 10 through a pipe 62 that emerges in a downward direction through the substantially horizontal part 12d of the jacket 12 of the reactor, above the central region 18.

The liquid, constituted by the uranyl nitrate to be reduced, mixed with nitric acid in the application being considered, is also continuously introduced into the reactor, through the pipe 20.

In addition, hydrogen is introduced continuously under pressure through the pipe 26. This gas has three functions.
to provide the pressure in the installation
to ensure good circulation of the fluid inside the reactor;
to provide the chemical reaction.

In the case of the application described, the chemical reaction only consumes a small fraction of the gas. It is then advantageous, as illustrated in FIG. 1, to recycle the excess gas through a pipe 64, from a branch pipe situated on the pipe 48, at the outlet from the reactor 10, to the pipe 26 for introducing the gases, passing through a recirculation device 66.

The hydrogen injection flow rate (arrows F1), which depends on the pressure, is sufficient to create an ascending circulation of the liquid and of the solid catalyst in the central region 18 of the reactor, as the arrows F3 illustrate in FIG. 1. It must nevertheless be restricted, in order to prevent the liquid fraction leaving the reactor carrying with it too many solid particles which would risk blocking the filter 36.

When the fluid circulating in this way in the central region passes into the upper region 30, the greater part of the liquid and all of the solid catalyst are recycled. They therefore descend into the annular region 22, as illustrated by arrow F4. The closed loop circulation created in this way inside the reactor 10 encourages the reduction of the uranyl nitrate because the solid catalyst is dispersed throughout the whole reactor.

For the reduction reaction to occur under the best conditions, it is important to keep the hydrogen pressure at a level that is preferably between about 30 bars and about 60 bars. The level N of the liquid in the upper region 30 is automatically maintained at the level of the overflow pipe 42.

Conforming to the invention, maintaining the pressure in the reactor 10 and the level in the separator 52 is achieved efficiently by acting on both valves 56 and 60. The adjustments made in this way enable one effectively to control the pressure in the reactor, because the fluctuations in the level measurements and the pressure measurements are attenuated in the separator 52 in comparison with the reactor (fluctuations in level and in pressure in the reactor are due to bubbling caused by the gas).

The reduction of uranyl nitrate is a strongly exothermic reaction. So as to avoid the occurrence of parasitic reactions, it is therefore desirable to maintain the temperature inside the reactor 10 at levels preferably between about 10° C. and about 20° C.

This result can be obtained easily by fitting both the external jacket 12 and the cylindrical partition 24 with cooling means. These cooling means may notably include circulation of a refrigerating fluid such as water within the structures with a double jacket (FIG. 1).

In the case of reactions other than the reduction of uranyl nitrate, the external jacket 12 and the cylindrical partition 24 may also, contrary to this, be fitted with means of heating the reaction medium.

In the event of lower catalyst activity, it is possible either to automatically discharge it either through a purge pipe 68 that is fitted just above the distribution plate 16, or to proceed to a catalyst regeneration carried out inside the reactor 10.

In the latter case, regeneration is carried out by discharging all the liquids contained in the reactor through a drainage pipe (not shown) fitted in the bottom of the reactor. This drainage pipe can have a part in common with the pipe 20 used to introduce the liquid or may be totally separate from it.

The reactor is then filled with water. The injection of the water takes place in the lower part 14 of the reactor either through pipe 20 or through a separate pipe.

One then proceeds to a sparging operation for a specified time, using an inert gas such as nitrogen in the case of the application being considered here. The gas is injected in the reactor through the pipe 26 and the device 28. This time can be about half an hour for the application under consideration.

The water is then discharged and the reactor can be started up once again.

In addition to these advantages associated with the handling of the catalyst, the installation described allows one to simplify both the maintenance and the operation of the reactor.

In effect, the fact that the reactor 10 is of the gas siphon type, the catalyst is transported with the liquid. It is therefore not subjected to any mechanical pressure. No other operation apart from the regeneration or replacement of the catalyst is necessary.

In addition, the use of a reactor of the gas siphon type enables one to provide closed loop circulation between the central region 18 and the annular region 22. This circulation, induced by the difference in the density of the fluids between these two parts, creates good thermal homogeneity which enables one to control the temperature of the medium in a particularly simple fashion, only using two sensors.

It should be understood that the invention is not restricted to the embodiment which has just been described, but covers all variants immediately accessible to a man skilled in the art. In particular, as has already been mentioned, the method and the installation according to the invention can be used for the carrying out of any thee phase chemical reaction under pressure in the presence of a gas phase, a liquid phase and a third phase which may, according to the case, be a liquid or a solid. Hence, the invention can be used, for example, to carry out a liquid-liquid chemical reaction accelerated by a carrier gas, or to carry out an oxidation reaction of an ore, such as a uranium ore, in an acid medium, under an atmosphere of oxygen.

What is claimed is:

1. Method of carrying out a three phase chemical reaction under pressure that involves a gas phase and two non-gaseous phases, at least one of which is liquid, said method comprising the following steps:

circulating, in a closed loop and co-currently two non-gaseous phases, in a reactor, by injection of the gas phase into the bottom of a central region of the reactor, in a way that creates an ascending circulation in said central region and a descending circulation in the annular region of the reactor, separated from the central region by a cylindrical partition;

separation and recovery, in an upper region of the reactor, of excess gas phase and a liquid is fraction;

separate routing of the excess gas phase and the liquid fraction into a separator outside the reactor; and regulation of the pressure in the reactor and the level in the separator, by adjustment of a gas flow rate and a liquid flow rate leaving the separator.

2. Method according to claim 1, in which the liquid fraction in said upper region is recovered through a lateral branch pipe positioned behind a profiled wall that inflects the circulation towards the annular region of the reactor and the liquid fraction is filtered at the inlet to said branch pipe.

3. Method according to claim 1, in which said gas and non-gaseous phases are cooled inside the reactor.

4. Method according to claim 1, in which said gas and non-gaseous phases are heated inside the reactor.

5. Method according to claim 1, in which a reducing reaction is carried out on a liquid product under pressure using a gaseous reducing agent, in the presence of a solid catalyst.

6. Method according to claim 5, in which the solid catalyst is periodically regenerated inside the reactor, by carrying out the following steps:

discharge of the liquid phase;

filling the reactor with water;

sparging with an inert gas, for a specified time;

emptying the water.

7. Method according to claim 5, in which the reduction reaction carried out is the reduction of uranyl nitrate by hydrogen in the presence of platinum on a silica carrier.

* * * * *

UNITED STATES PATENT AND TRADEMARK OFFICE
CERTIFICATE OF CORRECTION

PATENT NO.    : 6,759,027 B1
DATED         : July 6, 2004
INVENTOR(S)   : Pietro Bilardello et al.

It is certified that error appears in the above-identified patent and that said Letters Patent is hereby corrected as shown below:

Column 7,
Line 26, please delete "the" and insert therefor -- an --.

Signed and Sealed this

Twenty-third Day of November, 2004

JON W. DUDAS
*Director of the United States Patent and Trademark Office*